(12) United States Patent
Nguyen

(10) Patent No.: US 11,059,491 B2
(45) Date of Patent: Jul. 13, 2021

(54) DRIVING ABNORMALITY DETECTION

(71) Applicant: Lytx, Inc., San Diego, CA (US)

(72) Inventor: Vincent Nguyen, San Diego, CA (US)

(73) Assignee: Lytx, Inc., San Diego, CA (US)

(*) Notice: Subject to any disclaimer, the term of this patent is extended or adjusted under 35 U.S.C. 154(b) by 0 days.

(21) Appl. No.: 15/896,942

(22) Filed: Feb. 14, 2018

(65) Prior Publication Data

US 2018/0257659 A1 Sep. 13, 2018

Related U.S. Application Data

(63) Continuation of application No. 14/966,325, filed on Dec. 11, 2015, now Pat. No. 9,925,987.

(51) Int. Cl.
| | | |
|---|---|---|
| *B60W 40/09* | (2012.01) | |
| *G07C 5/02* | (2006.01) | |
| *G06K 9/00* | (2006.01) | |
| *G08G 1/01* | (2006.01) | |
| *G07C 5/08* | (2006.01) | |
| *G07C 5/00* | (2006.01) | |
| *B60W 50/14* | (2020.01) | |
| *B60Q 9/00* | (2006.01) | |
| *B60W 40/00* | (2006.01) | |
| *B60W 40/02* | (2006.01) | |
| *B60W 40/06* | (2012.01) | |

(Continued)

(52) U.S. Cl.
CPC ............ *B60W 40/09* (2013.01); *B60Q 9/00* (2013.01); *B60W 50/14* (2013.01); *G06K 9/00845* (2013.01); *G07C 5/008* (2013.01); *G07C 5/02* (2013.01); *G07C 5/085* (2013.01); *G07C 5/0816* (2013.01); *G08G 1/0112* (2013.01); *G08G 1/0129* (2013.01); *B60W 40/00* (2013.01); *B60W 40/02* (2013.01); *B60W 40/04* (2013.01); *B60W 40/06* (2013.01); *B60W 40/08* (2013.01); *B60W 2050/146* (2013.01); *B60W 2510/0638* (2013.01); *B60W 2520/10* (2013.01); *B60W 2540/10* (2013.01); *B60W 2540/12* (2013.01); *B60W 2540/18* (2013.01); *B60W 2554/80* (2020.02); *B60W 2556/50* (2020.02); *G06Q 40/08* (2013.01); *G08G 1/163* (2013.01)

(58) Field of Classification Search
CPC ...... B60W 40/00; B60W 40/02; B60W 40/04; B60W 40/06; B60W 40/08; B60W 40/09; B60W 40/105; B60W 2050/0077; B60W 2050/0089; B60W 2550/143; G06Q 40/08; G08G 1/16; G08G 1/163; G06K 9/00845

See application file for complete search history.

(56) References Cited

U.S. PATENT DOCUMENTS

| | | | | |
|---|---|---|---|---|
| 2009/0030619 | A1* | 1/2009 | Kameyama | ....... G06F 17/30749 702/19 |
| 2013/0138591 | A1* | 5/2013 | Ricci | ..................... G06F 3/0481 706/46 |

(Continued)

*Primary Examiner* — Benyam Haile
(74) *Attorney, Agent, or Firm* — Van Pelt, Yi & James LLP

(57) ABSTRACT

A system for detecting abnormal driver behavior includes an input interface and a processor. The input interface is for receiving a sensor data of a vehicle. The processor is for determining a driving behavior based at least in part on the sensor data of the vehicle; determining whether the driving behavior is abnormal; and, in the event that the driving behavior is abnormal, indicating an abnormal driver behavior.

15 Claims, 8 Drawing Sheets

(51) Int. Cl.
    *B60W 40/08* (2012.01)
    *G06Q 40/08* (2012.01)
    *B60W 40/04* (2006.01)
    *G08G 1/16* (2006.01)

(56) References Cited

U.S. PATENT DOCUMENTS

2015/0211879 A1* 7/2015 Nomura ................ G08G 1/161
                                                701/523
2016/0046298 A1* 2/2016 DeRuyck .............. B60W 50/14
                                                340/576
2016/0144713 A1* 5/2016 Verheijen ............ B60R 16/0236
                                                701/123

* cited by examiner

DRIVING ABNORMALITY DETECTION

CROSS REFERENCE TO OTHER APPLICATIONS

This application is a continuation of co-pending U.S. patent application Ser. No. 14/966,325, entitled DRIVING ABNORMALITY DETECTION filed Dec. 11, 2015 which is incorporated herein by reference for all purposes.

BACKGROUND OF THE INVENTION

Modern vehicles (e.g., airplanes, boats, trains, cars, trucks, etc.) can include a vehicle event recorder in order to better understand the risks and inefficiencies associated with vehicles and their drivers. A vehicle event recorder typically includes a set of sensors, e.g., video recorders, audio recorders, accelerometers, gyroscopes, vehicle state sensors, GPS (global positioning system), etc., that report data, which is used to determine the occurrence of these risks and inefficiencies by recording anomalous events. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. One class of problems leading to risks are atypical driver behaviors.

BRIEF DESCRIPTION OF THE DRAWINGS

Various embodiments of the invention are disclosed in the following detailed description and the accompanying drawings.

DETAILED DESCRIPTION

Figure 1:
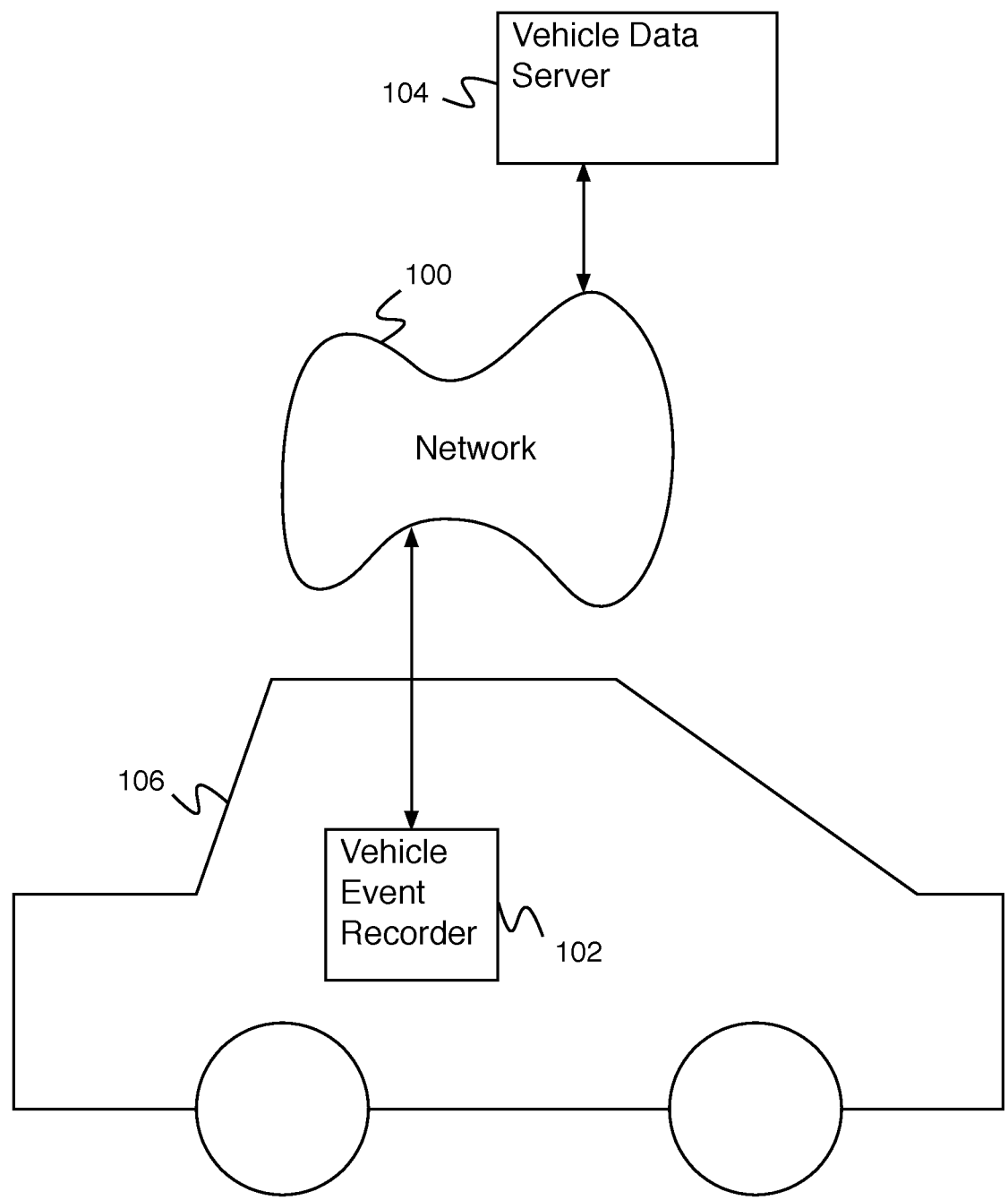
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for detecting abnormal driver behavior comprises an input interface for receiving a sensor data of a vehicle, and a processor for determining a driving behavior based at least in part on the sensor data of the vehicle, determining whether the driving behavior is abnormal, and in the event that the driving behavior is abnormal, indicating an abnormal driver behavior. In some embodiments, the system additionally comprises a memory coupled to the processor and configured to provide the processor with instructions.

In some embodiments, a system for determining abnormal driver behavior comprises a vehicle event recorder comprising a processor and a memory. The vehicle event recorder is coupled to a set of sensors (e.g., audio sensors, video sensors, accelerometers, gyroscopes, global positioning system sensors, vehicle state sensors, etc.) for recording vehicle data. The vehicle event recorder determines a set of maneuver profiles (e.g., a braking profile, a turning profile, an acceleration profile, etc.) from the data and compares the maneuver profiles with a set of historical maneuver profiles. In some embodiments, the set of historical maneuver profiles comprises a set of historical maneuver profiles for the driver (e.g., the historical maneuver profiles comprise a record of how the driver typically drives). A cumulative abnormality is determined comprising the cumulative deviation of the maneuver profiles from the historical maneuver profiles (e.g., how much the current driver behavior deviates from the typical driver behavior). In the event it is determined that the cumulative abnormality is greater than a threshold, an abnormal driver behavior is indicated.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle event recorder 102 includes a camera that faces outside of a vehicle, which in conjunction with processing, that enables vehicle event recorder 102 to estimate lane marker positions, estimate other vehicle positions, determine lane departures, determine lane change frequencies, determine headway to other vehicles, or any appropriate driving data. In some embodiments, vehicle event recorder 102 includes a camera that faces inside of a vehicle, which in conjunction with processing, that enables vehicle event recorder 102 to estimate a degree of smiling and/or frowning. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In some embodiments, vehicle event recorder 102 comprises a processor and a memory. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for detecting abnormal driving.

Figure 2:
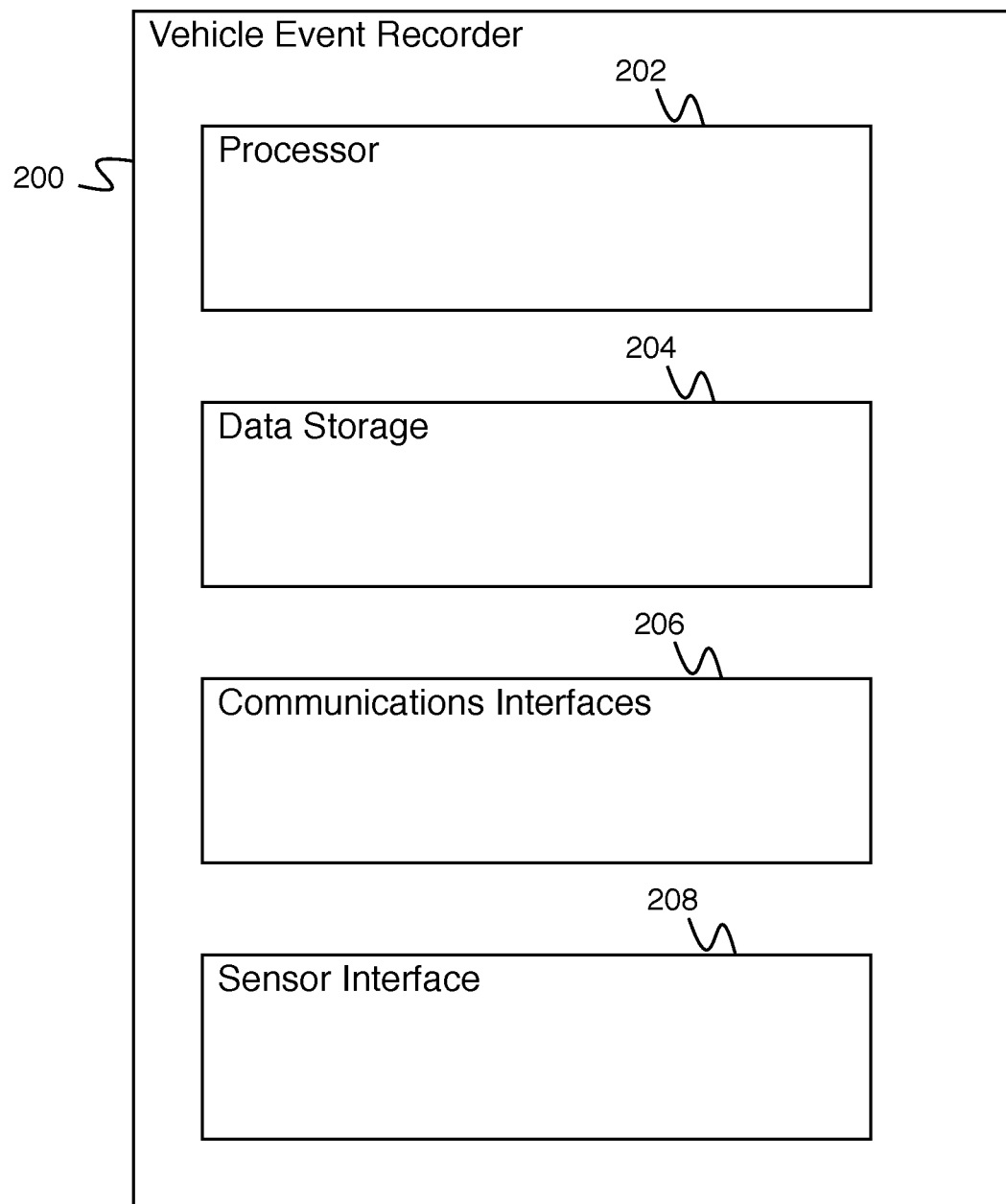
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In some embodiments, compliance data is received via sensor interface 208. In some embodiments, compliance data is received via communications interface 206. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 additionally comprises a memory coupled to processor 202. In various embodiments, the memory comprises a magnetic memory, an optical memory, a solid-state memory, a flash memory, a nonvolatile memory, a read-only memory, a tape memory, a disc memory, or any other appropriate memory.

Figure 3:
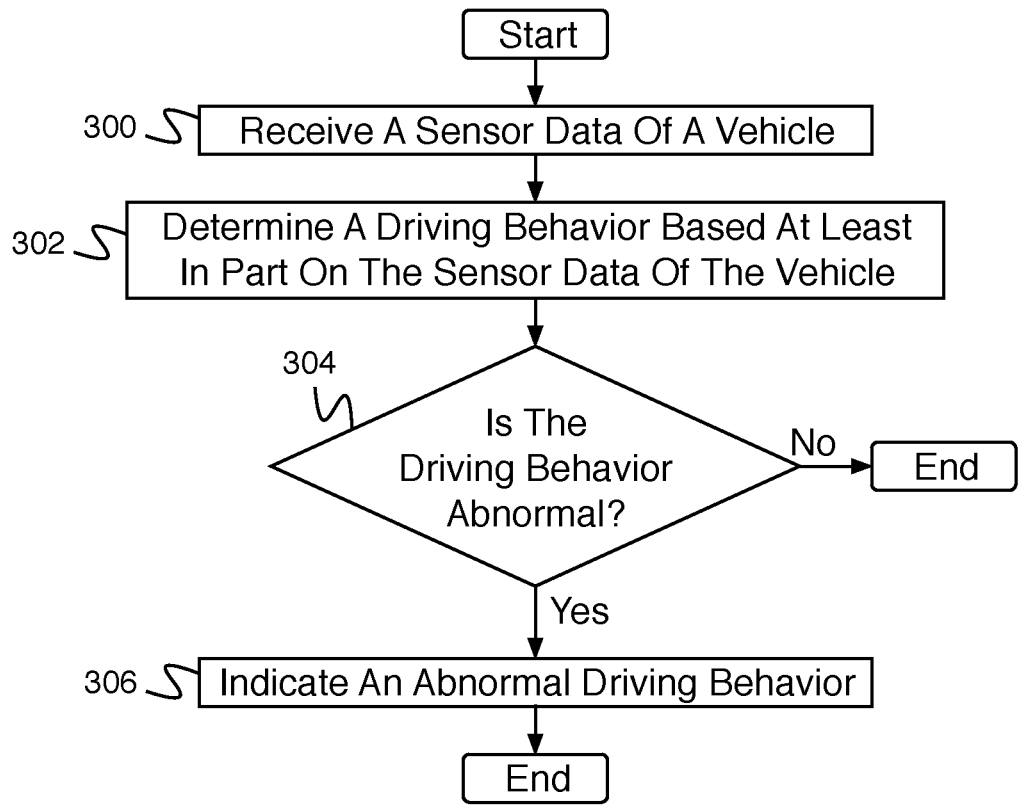
FIG. 3 is a flow diagram illustrating an embodiment of a process for detecting abnormal driver behavior.

FIG. 3 is a flow diagram illustrating an embodiment of a process for detecting abnormal driver behavior. In some embodiments, the process of FIG. 3 is executed by vehicle event recorder 102 of FIG. 1. In the example shown, in 300, a sensor data of a vehicle is received. In various embodiments, sensor data comprises location data (e.g., GPS data), accelerometer data, braking data, turning data, fuel data, RPM data, proximity data, or any other appropriate data. In 302, a driving behavior is determined based at least in part on the sensor data of the vehicle. In some embodiments, determining a driving behavior comprises determining a set of maneuvers (e.g., a set of maneuvers describing the driving behavior—for example, a braking profile, a turning profile, an acceleration profile, etc.). In 304, it is determined whether the driving behavior is abnormal. In some embodiments, determining whether the driving behavior is abnormal comprises comparing the driving behavior to a normal driving behavior. In some embodiments, determining whether the driving behavior is abnormal comprises determining whether a cumulative abnormality is greater than a threshold. In some embodiments, the cumulative abnormality comprises a cumulative abnormality over a period of time (e.g., the cumulative abnormality in the last five minutes, the last hour, etc.). In the event it is determined that the driving behavior is not abnormal, the process ends. In the event it is determined that the driving behavior is abnormal, control passes to 306. In 306, an abnormal driving behavior is indicated. In some embodiments, instructions for the steps of the process of FIG. 3 are stored in a memory and provided for execution by a processor coupled to the memory. In various embodiments, the memory comprises a magnetic memory, a solid-state memory, an optical memory, or any other appropriate memory.

Figure 4:
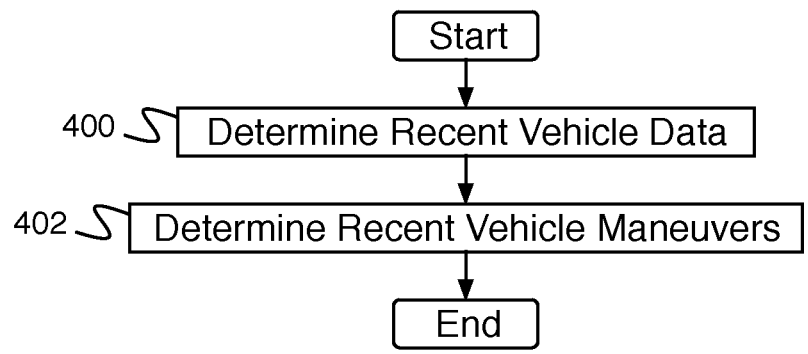
FIG. 4 is a flow diagram illustrating an embodiment of a process for determining a driving behavior based at least in part on sensor data.

FIG. 4 is a flow diagram illustrating an embodiment of a process for determining a driving behavior based at least in part on sensor data. In some embodiments, the process of FIG. 4 implements 302 of FIG. 3. In the example shown, in 400, recent vehicle data is determined. In some embodiments, recent vehicle data comprises sensor data received in 300 of FIG. 3. In some embodiments, recent vehicle data comprises sensor data received in 300 of FIG. 3 combined with previous sensor data (e.g., ten seconds of sensor data, one minute of sensor data, ten minutes of sensor data, etc.). In some embodiments, recent vehicle data comprises recent vehicle data for a driver. In 402, recent vehicle maneuvers are determined. In some embodiments, recent vehicle maneuvers comprise recent vehicle maneuvers based at least in part on recent vehicle data. In some embodiments, recent vehicle maneuvers comprise recent vehicle maneuvers for a driver.

Figure 5:
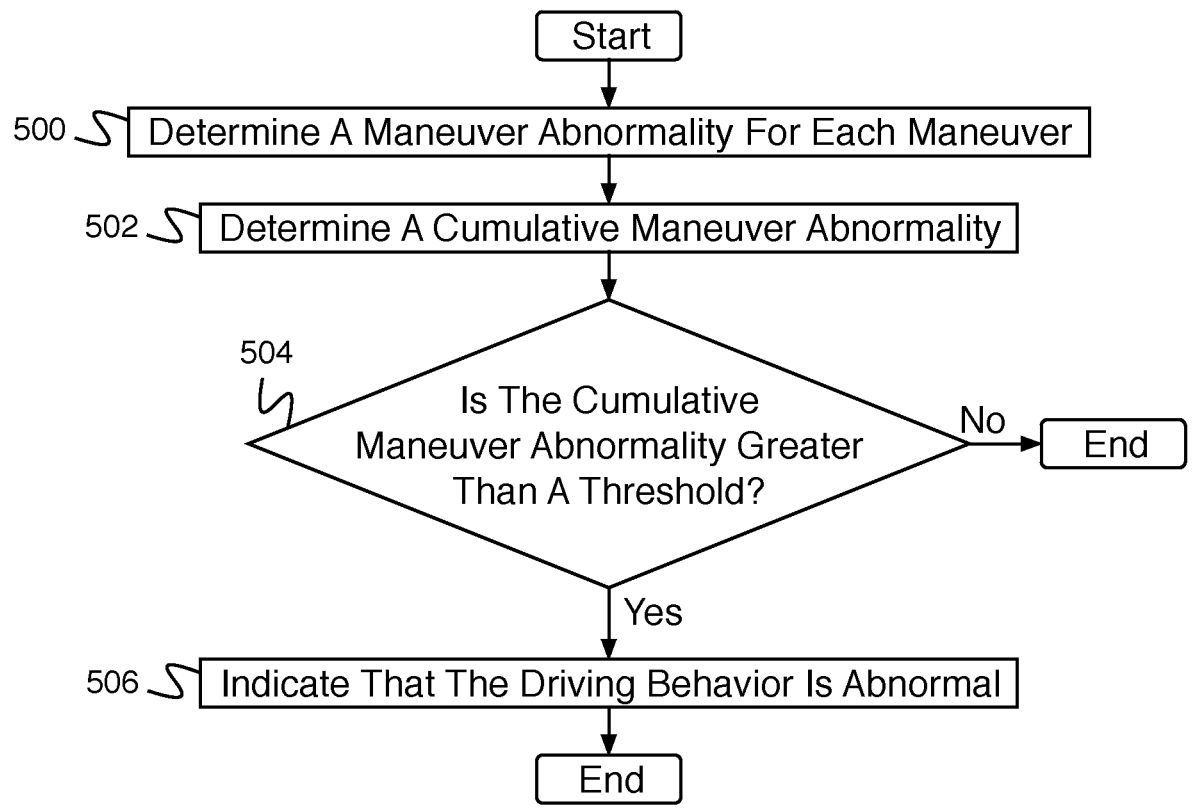
FIG. 5 is a flow diagram illustrating an embodiment of a process for determining whether a driving behavior is abnormal.

FIG. 5 is a flow diagram illustrating an embodiment of a process for determining whether a driving behavior is abnormal. In some embodiments, the process of FIG. 5 implements 304 of FIG. 3. In the example shown, in 500, a maneuver abnormality is determined for each maneuver. In some embodiments, the maneuver abnormality comprises the difference between a recent vehicle maneuver and normal vehicle maneuver. In some embodiments, the maneuver abnormality comprises a driver maneuver abnormality (e.g., the maneuver abnormality comprises the difference between a recent vehicle maneuver for a driver and a normal vehicle maneuver for a driver). In 502, a cumulative maneuver abnormality is determined. In various embodiments, a cumulative maneuver abnormality comprises an aggregation, a sum, a weighted sum of each maneuver abnormality for a set of maneuvers. In some embodiments, a cumulative maneuver abnormality comprises an aggregation of one or more maneuver abnormalities over a period of time (e.g., the last five minutes, the last hour, the present day, etc.). In 504, it is determined whether the cumulative maneuver abnormality is greater than a threshold. In the event it is determined that the cumulative maneuver abnormality is not greater than a threshold, the process ends. In the event it is determined that the cumulative maneuver abnormality is greater than a threshold, control passes to 506. In 506, the process indicates that the driving behavior is abnormal.

Figure 6:
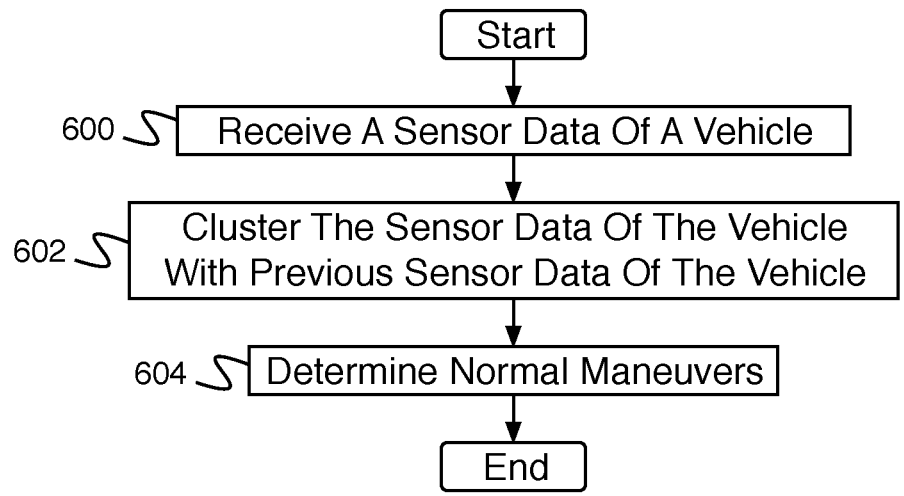
FIG. 6 is a flow diagram illustrating an embodiment of a process for determining a normal driving behavior.

FIG. 6 is a flow diagram illustrating an embodiment of a process for determining a normal driving behavior. In some embodiments, the process of FIG. 4 is executed by vehicle event recorder 102 of FIG. 1. In some embodiments, a normal driving behavior determined by the process of FIG. 6 is used as part of a process for determining whether a driving behavior is abnormal (e.g., in 304 of FIG. 3). In the example shown, in 600, a sensor data of a vehicle is received. In some embodiments, the sensor data comprises the sensor data received in 300 of FIG. 3. In 602, the sensor data of the vehicle is clustered with previous sensor data of the vehicle. In some embodiments, clustering the sensor data comprises adding the sensor data to a sensor data database. In some embodiments, sensor data of the vehicle is clustered with previous sensor data of the vehicle for the driver (e.g., data for different drivers is kept separate). In 604 normal maneuvers are determined. In some embodiments, normal maneuvers comprise normal maneuvers for a driver. In some embodiments, normal maneuvers comprise normal driving behaviors.

Figure 7:
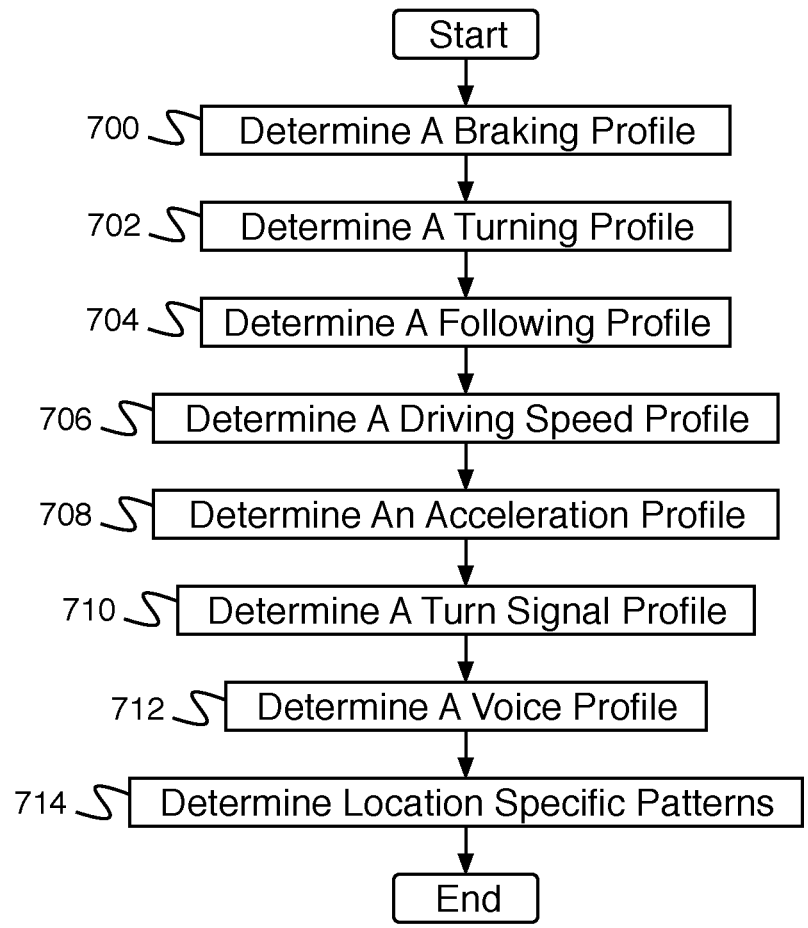
FIG. 7 is a flow diagram illustrating an embodiment of a process for determining driving behaviors.

FIG. 7 is a flow diagram illustrating an embodiment of a process for determining driving behaviors. In some embodiments, the process of FIG. 7 implements 604 of FIG. 6. In some embodiments, the process of FIG. 7 implements 402 of FIG. 4. In the example shown, in 700, a braking profile is determined. In various embodiments, a braking profile comprises a typical brake application rate, a typical deceleration curve, a typical brake position, or any other appropriate braking profile. In 702, a turning profile is determined. In various embodiments, a turning profile comprises a typical steering wheel turning rate, a preferred turning radius, a typical turning path, or any other appropriate turning profile. In 704, a following profile is determined. In various embodiments, a following profile comprises an approach rate, a typical following distance, a minimum following distance, a backoff rate, or any other appropriate following profile. In 706, a driving speed profile is determined. In various embodiments, a driving speed profile comprises a typical city street driving speed, a typical highway driving speed, a typical driving speed to speed limit ratio, or any other appropriate driving speed profile. In 708, an acceleration profile is determined. In various embodiments, an acceleration profile comprises a typical acceleration rate coming up to highway speed, a typical acceleration rate from a stop, a typical acceleration rate when passing another vehicle, or any other appropriate typical acceleration rate. In 710, a turn signal profile is determined. In various embodiments, a turn signal profile comprises a typical distance a turn signal is lit before turning on a city street, a typical time a turn signal is lit before changing lanes on a highway, whether a turn signal is used to signal a highway exit, or any other appropriate turn signal profile. In 712, a voice profile is determined. In various embodiments, a voice profile comprises a fraction of the time the driver voice is heard, a typical driver voice volume, a typical driver voice tone, whether or not certain words are heard from the driver (e.g., profanity), or any other appropriate voice profile. In 714, location specific patterns are determined. In some embodiments, location specific patterns comprise driving maneuvers that are specific to a particular location. In various embodiments, location specific parameters comprise a path for a particular sharp turn, a behavior at a difficult intersection, a driving speed leading into a short merge, or any other appropriate location specific parameters.

In some embodiments, a smile or frown profile is determined.

In some embodiments, abnormal behavior determination comprises determining a difference (e.g., distance) between a normal behavior (e.g., as part of a profile) and a current behavior and summing differences up for different behaviors (e.g., braking behavior, turning behavior, following behavior, driving speed behavior, acceleration behavior, turn signal behavior, voice behavior, location specific pattern behavior, smile behavior, frown behavior, or any other appropriate behavior. In some embodiments, the summation of the difference of behaviors is used in the determination of an abnormal behavior in the event that the summation is greater than a threshold (e.g., a predetermined threshold).

Figure 8:
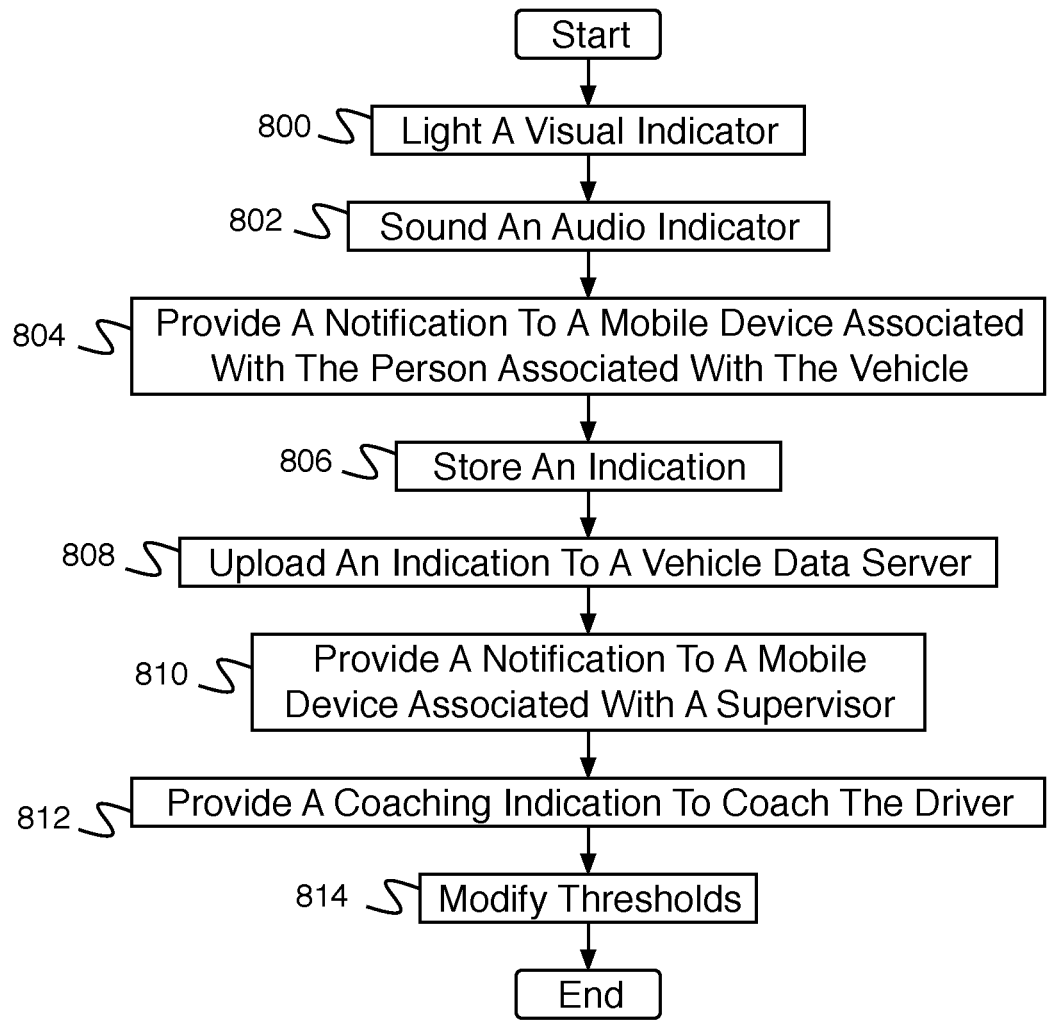
FIG. 8 is a flow diagram illustrating an embodiment of a process for indicating a person is not complying.

FIG. 8 is a flow diagram illustrating an embodiment of a process for indicating a person is not complying. In some embodiments, the process of FIG. 8 implements 306 of FIG. 3. In various embodiments, the process executes any or all of the steps of FIG. 8. In the example shown, in 800, a visual indicator is lit (e.g., a light mounted on the vehicle event recorder is turned on). In 802, an audio indicator is sounded (e.g., a speaker mounted on the vehicle event recorder beeps, buzzes, etc.). In 804, a notification is provided to a mobile device (e.g., a smartphone, a tablet computer, etc.) associated with the person associated with the vehicle. In 806, an indication is stored. In 808, an indication is uploaded to a vehicle data server (e.g., a vehicle data server as in vehicle data server 104 of FIG. 1). In 810, a notification is provided to a mobile device associated with a supervisor. In 812, a coaching indication to coach the driver is provided. In 814, thresholds (e.g., sensor data thresholds for detection of anomalous events) are modified.

In some embodiments, "road rage" behaviors (e.g., aggressive tailgating, quick lane change maneuvers, rapid acceleration/deceleration, etc.) are detected for a driver following a provocation (e.g., being cut off by another vehicle). The behavior is marked as abnormal. An event recorder uploads the event to a server for review. In review, specific behaviors are marked (e.g., aggressive driving, aggressive tailgating, quick lane change maneuvers, rapid acceleration/deceleration, etc.). Upon review, an event is marked for coaching a driver regarding behavior. In various embodiments, coachable event comprise a positive coaching event (e.g., behaviors to encourage) or a negative coaching event (e.g., behaviors to avoid), or any other appropriate behavior for coaching. In various embodiments, thresholds are modified to increase the number of events available for detection of abnormal driving or for coaching or to decrease the number of events available for detection of abnormal driving or for coaching or for any other appropriate reasons for modifying thresholds.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting abnormal driver behavior, comprising:
an input interface configured to receive a sensor data of a vehicle; and
a processor coupled to the input interface and configured to:
determine a driving behavior based at least in part on the sensor data of the vehicle, wherein the driving behavior includes a set of maneuvers of a most recent driving session, wherein the sensor data of the vehicle includes at least three or more of the following: location data, global positioning system (GPS) data, accelerometer data, braking data, turning data, fuel data, engine revolutions per minute (RPM) data, or proximity data, wherein to determine the driving behavior, the processor is configured to:
determine the set of maneuvers of the most recent driving session, wherein to determine the set of maneuvers, the processor is configured to:
determine two or more of the following types of profiles: a braking profile, a turning profile, an acceleration profile, a turn signal profile, a voice profile, a smile profile, or a frown profile, wherein the braking profile comprises a deceleration curve, a brake position, or any combination thereof, wherein the turning profile comprises a steering wheel turning rate, a preferred turning radius, or any combination thereof, wherein the acceleration profile comprises an acceleration rate coming up to highway speed, an acceleration rate from a stop, an acceleration rate when passing another vehicle, or any combination thereof, wherein the turn signal profile comprises a distance a turn signal is lit before turning on a city street, a time a turn signal is lit before changing lanes on a highway, or any combination thereof, wherein the voice profile comprises a fraction of the time a driver voice is heard, a driver voice volume, a driver voice tone, whether or not certain words are heard from a driver, whether or not profanity is heard from the driver, or any combination thereof;
determine whether the driving behavior is abnormal, comprising:
compare the set of maneuvers of the most recent driving session with a set of historical maneuvers to determine whether the driving behavior is abnormal, wherein an historical maneuver comprises a record of how the driver typically drives, wherein to compare the set of maneuvers of the most recent driving session with the set of historical maneuvers, the processor is configured to: calculate a first difference between a first profile associated with a first maneuver of the set of maneuvers and a corresponding historical profile associated with the first maneuver; calculate a second difference between a second profile associated with a second maneuver of the set of maneuvers and a corresponding historical profile associated with the second maneuver; aggregate the first difference and the second difference to obtain a cumulative maneuver abnormality, wherein to aggregate the first difference and the second difference, the processor is configured to: weigh the first difference using a first weight to obtain a first weighted difference; weigh the second difference using a second weight to obtain a second weighted difference; and combine the first weighted difference and the second weighted difference to obtain the cumulative maneuver abnormality; compare the cumulative maneuver abnormality with an abnormality threshold; and in response to a determination that the cumulative maneuver abnormality satisfies the abnormality threshold, determine that the driving behavior is abnormal; and in response to a determination that the driving behavior is abnormal:
    indicate an abnormal driver behavior;
    modify the abnormality threshold and a coaching threshold in a manner that increases a number of events available for coaching; and
    provide coaching for a user associated with the vehicle based on the modified coaching threshold.

2. The system of claim 1, wherein the processor is further configured to determine the set of historical maneuvers based at least in part on the sensor data of the vehicle.

3. The system of claim 2, wherein to determine the set of historical maneuvers, the processor is configured to cluster data.

4. The system of claim 2, wherein to determine the set of historical maneuvers, the processor is configured to determine normal maneuvers.

5. The system of claim 4, wherein to determine normal maneuvers, the processor is configured to determine a braking profile.

6. The system of claim 5, wherein the braking profile comprises a hard braking profile.

7. The system of claim 4, wherein to determine normal maneuvers, the processor is configured to determine a turning profile.

8. The system of claim 4, wherein to determine normal maneuvers, the processor is configured to determine an acceleration profile.

9. The system of claim 4, wherein to determine normal maneuvers, the processor is configured to determine a turn signal profile.

10. The system of claim 4, wherein to determine normal maneuvers, the processor is configured to determine a voice profile.

11. The system of claim 4, wherein to determine normal maneuvers, the processor is configured to determine one or more location specific patterns.

12. The system of claim 1, wherein to determine whether the driving behavior is abnormal, the processor is configured to determine if a cumulative abnormality is greater than a threshold.

13. The system of claim 12, wherein the cumulative abnormality comprises a cumulative abnormality over a period of time.

14. A method for detecting abnormal driver behavior, comprising:
    receiving a sensor data of a vehicle;
    determining, using a processor, a driving behavior based at least in part on the sensor data of the vehicle, wherein the driving behavior includes a set of maneuvers of a most recent driving session, wherein the sensor data of the vehicle includes at least three or more of the following: location data, global positioning system (GPS) data, accelerometer data, braking data, turning data, fuel data, engine revolutions per minute (RPM) data, or proximity data, wherein the determining of the driving behavior comprises:
        determining the set of maneuvers of the most recent driving session, wherein the determining of the set of maneuvers comprises:
            determining two or more of the following types of profiles: a braking profile, a turning profile, an acceleration profile, a turn signal profile, a voice profile, a smile profile, or a frown profile, wherein the braking profile comprises a deceleration curve, a brake position, or any combination thereof, wherein the turning profile comprises a steering wheel turning rate, a preferred turning radius, or any combination thereof, wherein the acceleration profile comprises an acceleration rate coming up to highway speed, an acceleration rate from a stop, an acceleration rate when passing another vehicle, or any combination thereof, wherein the turn signal profile comprises a distance a turn signal is lit before turning on a city street, a time a turn signal is lit before changing lanes on a highway, or any combination thereof, wherein the voice profile comprises a fraction of the time a driver voice is heard, a driver voice volume, a driver voice tone, whether or not certain words are heard from a driver, whether or not profanity is heard from the driver, or any combination thereof;
    determining whether the driving behavior is abnormal, comprising:
        comparing the set of maneuvers of the most recent driving session with a set of historical maneuvers to determine whether the driving behavior is abnormal, wherein an historical maneuver comprises a record of how the driver typically drives, wherein the comparing of the set of maneuvers of the most recent driving session with the set of historical maneuvers comprises:
            calculating a first difference between a first profile associated with a first maneuver of the set of maneuvers and a corresponding historical profile associated with the first maneuver;
            calculating a second difference between a second profile associated with a second maneuver of the set of maneuvers and a corresponding historical profile associated with the second maneuver;
            aggregating the first difference and the second difference to obtain a cumulative maneuver abnormality, comprising:
                weighing the first difference using a first weight to obtain a first weighted difference;
                weighing the second difference using a second weight to obtain a second weighted difference; and
                combining the first weighted difference and the second weighted difference to obtain the cumulative maneuver abnormality;
        comparing the cumulative maneuver abnormality with an abnormality threshold; and
        in response to a determination that the cumulative maneuver abnormality satisfies the abnormality threshold, determining that the driving behavior is abnormal; and
    in response to a determination that the driving behavior is abnormal:
        indicating an abnormal driver behavior;
        modifying the abnormality threshold and a coaching threshold in a manner that increases a number of events available for coaching; and
        providing coaching for a user associated with the vehicle based on the modified coaching threshold.

15. A computer program product for detecting abnormal driver behavior, the computer program product being embodied in a non-transitory computer readable storage medium and comprising computer instructions for:

receiving a sensor data of a vehicle;
determining, using a processor, a driving behavior based at least in part on the sensor data of the vehicle, wherein the driving behavior includes a set of maneuvers of a most recent driving session, wherein the sensor data of the vehicle includes at least three or more of the following:
location data, global positioning system (GPS) data, accelerometer data, braking data, turning data, fuel data, engine revolutions per minute (RPM) data, or proximity data, wherein the determining of the driving behavior comprises:
  determining the set of maneuvers of the most recent driving session, wherein the determining of the set of maneuvers comprises:
    determining two or more of the following types of profiles: a braking profile, a turning profile, an acceleration profile, a turn signal profile, a voice profile, a smile profile, or a frown profile, wherein the braking profile comprises a deceleration curve, a brake position, or any combination thereof, wherein the turning profile comprises a steering wheel turning rate, a preferred turning radius, or any combination thereof, wherein the acceleration profile comprises an acceleration rate coming up to highway speed, an acceleration rate from a stop, an acceleration rate when passing another vehicle, or any combination thereof, wherein the turn signal profile comprises a distance a turn signal is lit before turning on a city street, a time a turn signal is lit before changing lanes on a highway, or any combination thereof, wherein the voice profile comprises a fraction of the time a driver voice is heard, a driver voice volume, a driver voice tone, whether or not certain words are heard from a driver, whether or not profanity is heard from the driver, or any combination thereof;
  determining whether the driving behavior is abnormal, comprising:
    comparing the set of maneuvers of the most recent driving session with a set of historical maneuvers to determine whether the driving behavior is abnormal, wherein an historical maneuver comprises a record of how the driver typically drives, wherein the comparing of the set of maneuvers of the most recent driving session with the set of historical maneuvers comprises:
      calculating a first difference between a first profile associated with a first maneuver of the set of maneuvers and a corresponding historical profile associated with the first maneuver;
      calculating a second difference between a second profile associated with a second maneuver of the set of maneuvers and a corresponding historical profile associated with the second maneuver;
      aggregating the first difference and the second difference to obtain a cumulative maneuver abnormality, comprising:
        weighing the first difference using a first weight to obtain a first weighted difference;
        weighing the second difference using a second weight to obtain a second weighted difference; and
        combining the first weighted difference and the second weighted difference to obtain the cumulative maneuver abnormality;
      comparing the cumulative maneuver abnormality with an abnormality threshold; and
      in response to a determination that the cumulative maneuver abnormality satisfies the abnormality threshold, determining that the driving behavior is abnormal; and
in response to a determination that the driving behavior is abnormal:
  indicating an abnormal driver behavior;
  modifying the abnormality threshold and a coaching threshold in a manner that increases a number of events available for coaching; and
  providing coaching for a user associated with the vehicle based on the modified coaching threshold.

* * * * *